United States Patent
Kopecek

(10) Patent No.: US 12,269,582 B1
(45) Date of Patent: Apr. 8, 2025

(54) ELECTROMECHANICAL AIRCRAFT SPOILER

(71) Applicant: Woodward, Inc., Fort Collins, CO (US)

(72) Inventor: Joseph Thomas Kopecek, Santa Clarita, CA (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 18/481,738

(22) Filed: Oct. 5, 2023

(51) Int. Cl.
*F16H 1/28* (2006.01)
*B64C 13/50* (2006.01)
*B64F 5/60* (2017.01)
*B64C 9/32* (2006.01)

(52) U.S. Cl.
CPC ............... *B64C 13/50* (2013.01); *B64F 5/60* (2017.01); *F16H 1/28* (2013.01); *B64C 9/323* (2013.01); *F16H 2001/2872* (2013.01)

(58) Field of Classification Search
CPC . B64C 13/50; B64C 9/323; B64F 5/60; F16H 1/28
See application file for complete search history.

(56) References Cited

U.S. PATENT DOCUMENTS

| | | | |
|---|---|---|---|
| 5,918,836 A | 7/1999 | Russ | |
| 9,038,944 B2 | 5/2015 | Senegas et al. | |
| 9,086,125 B2 | 7/2015 | Kopp et al. | |
| 9,685,838 B2 | 6/2017 | Ueyama et al. | |
| 10,066,715 B2 | 9/2018 | Larson et al. | |
| 2023/0160458 A1 | 5/2023 | Potier et al. | |

FOREIGN PATENT DOCUMENTS

| | | |
|---|---|---|
| EP | 0384808 A1 | 8/1990 |
| WO | WO 2022/130200 A1 | 6/2022 |

OTHER PUBLICATIONS https://www.amazon.com/S-HF1008-10x14x8-Stainless-One-Way-Bearing/dp/B00DV1ZOEM/ref=sr_1_2?crid=1976GKIC13HLE&keywords=stainless+one-way+bearing+S-HF100&qid=1704320168&sprefix=stainless+one+way+bearing+s-hf100%2Caps%2C96&sr=8-2; known prior to Oct. 5, 2023.

*Primary Examiner* — Derek D Knight
(74) *Attorney, Agent, or Firm* — Reinhart Boerner Van Deuren P.C.

(57) ABSTRACT

An actuator for a control surface is provided. The actuator includes a frame, an electric motor, an epicyclic gear, a power-off brake, a power-on brake, and a unidirectional bearing. A sun gear is operably coupled to an output of the motor. A carrier is couplable to the control surface such that rotation of the carrier in a first direction transitions the control surface toward the deployed position and rotation of the carrier in a second direction transitions the control surface toward the stowed position. The power-off brake couples to the sun gear to ground the sun gear when deenergized. The power-on brake couples to the ring gear to ground the ring gear when energized. When the power-on brake is deenergized, the unidirectional bearing permits the ring gear to rotate in the second direction and prevents the ring gear from rotating in the first direction.

17 Claims, 5 Drawing Sheets

ELECTROMECHANICAL AIRCRAFT SPOILER

FIELD OF THE INVENTION

This invention generally relates to control of control surfaces for aircraft and particularly actuators for control surfaces for aircraft.

BACKGROUND OF THE INVENTION

The aviation industry has moved towards "more electric" aircraft resulting in electromechanical flight controls as a replacement for conventional hydraulically powered flight controls. In addition, there has been increased developmental activity related to thin wing aircraft. This combination has presented unique challenges for the flight controls industry.

Spoilers are flight control devices that have typically been hydraulically controlled. Spoilers fall into two basic categories: flight spoilers and ground spoilers. Flight spoilers are used throughout the aircraft flight profile for altitude control and roll control. Ground spoilers are used for lift dump and aerodynamic braking during landing.

The challenge of an electromechanical spoiler is the safety requirements. Foremost is the go-down-stay-down requirement in the event of a failure. This means that the spoiler will stay down upon a failure in the system.

A floating spoiler occurs when power to the spoiler is lost, and the spoiler is controlled. The aerodynamic lift on the wing pulls the spoiler surface upwards resulting in higher aerodynamic drag and fuel consumption. A jammed spoiler occurs when there is a mechanical jam in the load path of the spoiler actuator. Other flight control surfaces such as ailerons and/or the opposite wing spoilers must be activated to maintain roll control. This also increases drag. Lastly there is the runaway case where the controls of the spoiler malfunction and cause uncommanded motion.

Conventional hydraulic spoilers solve the failure cases by incorporating go-down-stay-down capability. In particular, hydraulicly controlled spoilers have a check valve that allows hydraulic fluid in to the retract chamber of the spoiler actuator in the event of a failure but will not allow fluid out of the retract chamber. As such, air loads on the spoiler surface cause the spoiler to retract (go down) but never to extend (go up) in the event of a failure. This reduces the aerodynamic drag caused by the failed spoiler actuator to be reduced to acceptable levels. This capability is particularly critical for Extended Range Twin Engine Operations (ETOPS) certified aircraft for long range overseas twin-jet operation.

Another challenge for electromechanical spoilers is holding an external load in a fixed position while partially or fully extended. In a conventional electromechanical actuator, this requires a stalled motor condition. The motor remains energized to oppose the external loads and maintain a fixed position for the spoiler. This results in the motor consuming electrical current and heating the coils with the negative consequences of increased electrical power consumption and reducing the motor reliability and/or operational life.

New aircraft designs have thin wing designs for aerodynamic efficiency. Conventional linear actuators (either hydraulic or electric) have difficulty fitting in to the thin wing envelope. Hydraulic flight control designs use hingeline Rotary Piston Actuators (RPA) or Rotary Vane Actuators (RVA) to provide flight control actuation force or torque in the thin wing designs.

It would therefore be beneficial to provide a rotary electromechanical actuator for both flight and ground spoilers that will have go-down-stay-down capability for ETOPS certification for the following failure cases:
 1) Loss of electrical power;
 2) Motor or drive train jam; and
 3) Spoiler control runaway.

BRIEF SUMMARY OF THE INVENTION

A new and improved actuator for a control surface of an aircraft is provided. In particular, an electro-mechanical actuator for a control surface of an aircraft is provided.

In one example, the actuator for rotating a control surface of an aircraft between a stowed position and a deployed position is provided. The actuator includes a frame, an electric motor, an epicyclic gear, a power-off brake, a power-on brake, and a unidirectional bearing. The motor has an output. The epicyclic gear has a sun gear, planetary gears coupled to a carrier, and a ring gear. The sun gear is operably coupled to the output of the motor. The carrier is operably couplable to the control surface such that rotation of the carrier in a first direction corresponds to transitioning the control surface from the stowed position toward the deployed position and rotation of the carrier in an opposite second direction corresponds to transitioning the control surface from the deployed position toward the stowed position. The power-off brake is operably coupled to the sun gear to ground the sun gear to the frame when deenergized. The power-on brake is operably coupled to the ring gear to ground the ring gear to the frame when energized. The unidirectional bearing connects the ring gear to the frame. When the power-on brake is deenergized, the unidirectional bearing permits the ring gear to rotate in the second direction relative to the frame and prevents the ring gear from rotating in the first direction relative to the frame.

In an example, the frame is in the form of a housing. The motor is grounded to the housing. The power-off brake grounds the sun gear to the housing when deenergized. The power-on brake grounds the ring gear to the housing when energized.

In an example, a controller is operably coupled to and configured to selectively energize the motor, the power-off brake, and the power-on brake.

In an example, the controller is configured to rotate the carrier in the first direction by:
 a) energizing the motor to rotate the output thereof in a first motor direction;
 b) energizing the power-off brake to unground the sun gear; and
 c) energizing the power-on brake to ground the ring gear.

In an example, the controller is configured to rotate the carrier in the second direction by:
 a) energizing the motor to rotate the output thereof in a second motor direction, opposite the first motor direction;
 b) energizing the power-off brake; and
 c) energizing the power-on brake.

In an example, when the power-on brake is not energized, the carrier and ring gear are:
 a) rotatable in the second direction via the unidirectional bearing by an external loading applied to the carrier, and b) not rotatable in the first direction via the unidirectional bearing by an external loading applied to the carrier.

In an example, a motor position sensor is configured to sense a position of the motor. If the motor position sensor senses a motor position that is not at a commanded position, the controller is configured to deenergize the motor, power-off brake, and power-on brake.

In an example, when the power-on brake is deenergized, the unidirectional bearing:
 a) permits the ring gear to rotate relative to the frame in the second direction; and
 b) prevents the ring gear from rotating in the first direction relative to the frame.

In an example, the controller is configured to operate in a deploy mode where the carrier is rotated in the first direction, in the deploy mode, the controller:
 a) energizes the power-off brake to permit rotation of the sun gear;
 b) energizes the power-on brake to ground the ring gear; and
 c) energizes the motor to rotate the sun gear and planet gears to operably drive the carrier in the first direction; and
 d) upon a desired rotation of the carrier in the first direction, to maintain the position of the carrier, the controller:
  i) deenergizes the power-off brake to ground the sun gear;
  ii) deenergizes the motor; and
  iii) maintains the power-on brake energized.

In an example, upon an electrical failure and the motor, power-off brake, and power-on brake are all deenergized:
 a) the power-off brake grounds the sun gear to the frame;
 b) the power-on brake does not ground the ring gear to the frame permitting the ring gear and carrier to rotate in the second direction via the unidirectional bearing relative to the frame; and
 c) the unidirectional bearing prevents rotation of the ring gear and carrier in the first direction relative to the frame.

In an example, a motor rotation sensor is configured to sense rotation of the output of the motor. If the motor rotation sensor senses that the output of the motor is not rotating when energized, the controller:
 a) deenergizes the power-off brake to ground the sun gear and
 b) deenergizes the power-on brake to release the ring gear and permit rotation of the ring gear and carrier in the second direction via the unidirectional bearing.

In an example, when:
 a) in an operation mode in which the carrier is operably rotated by the motor:
  i) the power-off brake is energized;
  ii) the motor is energized; and
  iii) the power-on brake is energized; and
 b) in a failure mode in which at least one of a motor jam, controller runaway, or electrical failure has occurred:
  i) the power-off brake is deenergized grounding the sun gear;
  ii) the power-on brake is deenergized releasing the ring gear;
  iii) the motor is deenergized; and
  iv) the ring gear and carrier are permitted to rotate in the second direction via the unidirectional bearing.

In another example, a spoiler system for an aircraft is provided. The system includes a spoiler pivotable between a stowed position and a deployed position. The system includes an actuator as outlined above. The actuator has the carrier coupled to the spoiler such that rotation of the carrier in the first direction transitions the spoiler towards the deployed position and rotation of the carrier in the second direction transitions the spoiler towards the stowed position.

In an example, when:
 a) the power-off brake is deenergized; and
 b) the power-on brake is deenergized;
 the ring gear and carrier can rotate in the second direction via the unidirectional bearing to transition the spoiler towards the stowed position due to an external load forcing the spoiler towards the stowed position and the ring gear and carrier cannot rotate in the first direction via the unidirectional bearing such that the spoiler cannot transition towards the deployed position.

In another example, a method of operating an actuator outlined above includes:
 a) operating in a normal mode including:
  i) energizing the power-off brake to release the sun gear;
  ii) energizing the power-on brake to ground the ring gear;
  iii) energizing the motor in the first direction to rotate the sun gear in the first direction and to rotate the carrier in the first direction;
 b) operating in a failure mode including:
  i) deenergizing the power-off brake to ground the sun gear;
  ii) deenergizing the power-on brake to release the ring gear;
  iii) rotating the carrier in the second direction in response to an external force to the carrier and rotating the ring gear and carrier in the second direction through the unidirectional bearing;
  iv) preventing the carrier from rotating in the first direction by having the sun gear grounded with the power-off brake and preventing rotation of the ring gear in the first direction with the unidirectional bearing.

In an example, the steps of deenergizing the power-off brake and deenergizing the power-on brake occurs by a power failure to the system. As such, the deenergizing steps occur automatically.

In an example, operating in the failure mode includes: sensing an operational malfunction of the actuator including at least one of:
 a) a power failure to at least one of the motor, power-off brake, or power-on brake;
 b) a mechanical jam of the motor; or
 c) a motor malfunction including at least one of:
  i) the motor output being in a wrong sensed position; or
  ii) the motor output failing to turn when being energized.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
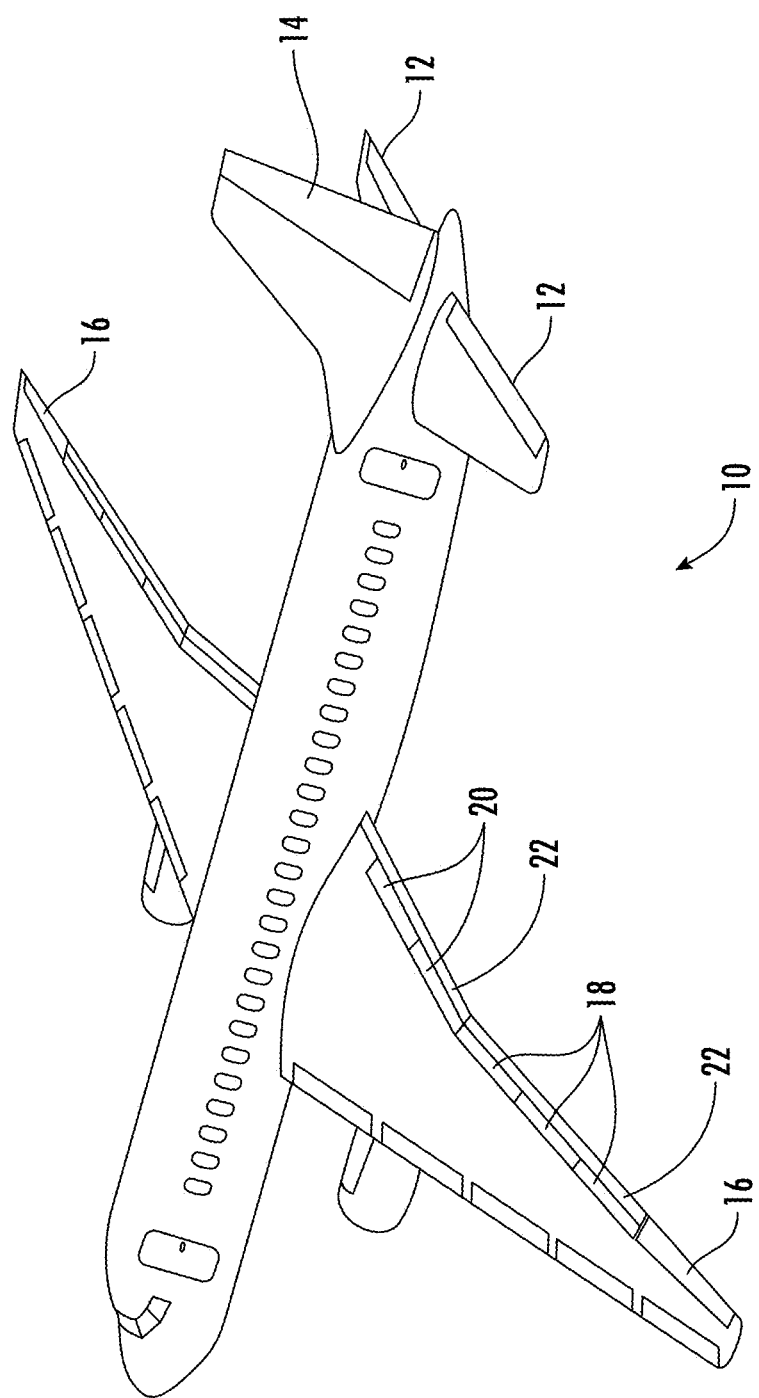
FIG. 1 is a simplified representation of an aircraft having numerous control surfaces.

FIG. 1 illustrates a generic aircraft 10 with numerous control surfaces including elevators 12, a rudder 14, ailerons 16, flight spoilers 18, ground spoilers 20 and flaps 22. These control surfaces can be actuated to control motion of the aircraft 10 while in flight, while on the ground and/or both. Typically, the control surfaces have hinges that allow for rotational actuation between deployed and stowed positions.

Figure 2:
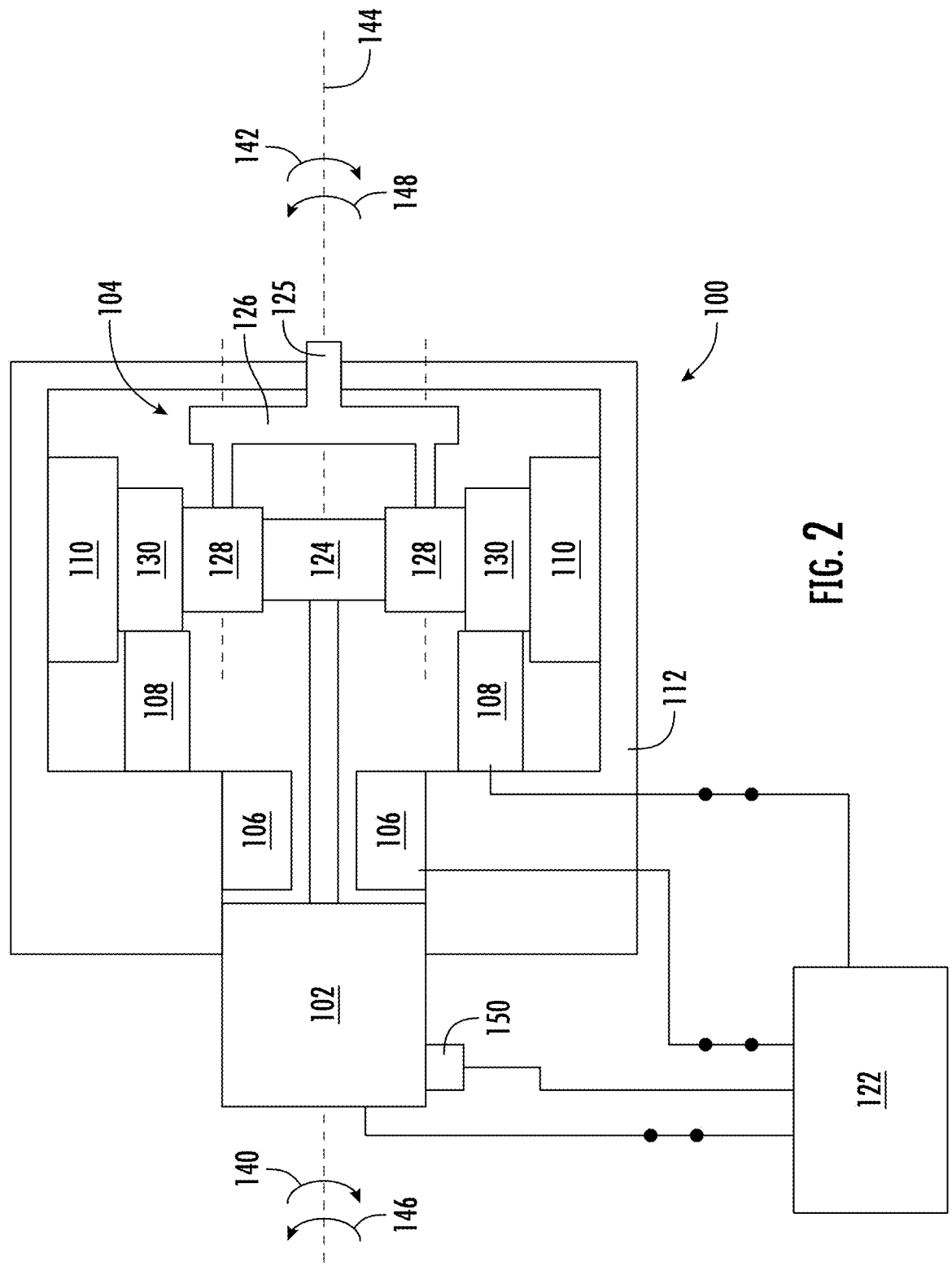
FIG. 2 is a schematic illustration of a control surface actuator during normal deployment and stowage of a control surface.

FIG. 2 is a schematic illustration of an electromechanical spoiler actuator 100. The actuator 100 may be hinge-mounted (see FIG. 5).

The actuator 100 includes an electric motor 102, an epicyclic gear 104, a power-off brake 106, a power-on brake 108 and a unidirectional bearing 110. These components may be mounted to a frame 112. The actuator 100 is configured to allow for driving a control surface between a stowed position and a deployed position. Further, the actuator 100 may be configured for go-down stay-down failure operation where the control surface can transition to the stowed position under external loads (e.g. air loads acting on the control surface) but cannot transition to the deployed position.

The actuator 100 may have a frame 120 to which various components are selectively or continuously grounded depending on the operational state of the actuator 100. In this example, motor 102, power-off brake 106, power-on brake 108 and unidirectional bearing 110 are all grounded to the frame 112. The frame 120 could take the form of a housing that houses one or more of the components entirely or in part or a portion of the aircraft to which the grounded components are fixed and particularly a portion of the wing of the aircraft.

A controller 122 operatively controls the motor 102, the power-off brake 106, and the power-on brake 108. The illustrated example is merely schematic. While illustrated as directly connected, the controller 122 could be wirelessly connected or configured to control other switches connected to these components that it controls.

The power-off brake 106 may be in the form of solenoid coil operated brake operable coupled between the frame 112 and the shaft between the motor 102 and the sun gear 124, the motor 102 or the sun gear 124 itself.

The motor 102 is operatively connected the to a sun gear 124 of the epicyclic gear 104. An output shaft 125 of carrier 126 the epicyclic gear 104 is operably coupled to the control surface. The carrier 126 is thus the output of the actuator 100 in this configuration. A plurality of planetary gears 128 are carried by the carrier 126 and act between the sun gear 124 and a ring gear 130.

The ring gear 130 of the epicyclic gear is carried by the unidirectional bearing 110.

In one example, the ring gear 130 is nested within the unidirectional bearing 110. The unidirectional bearing could be a one-way clutch, a one-way bearing, or other device used to permit rotary motion in only a single angular direction about a given axis. The one way bearing could be in the form of a one-way gear.

Figure 5:
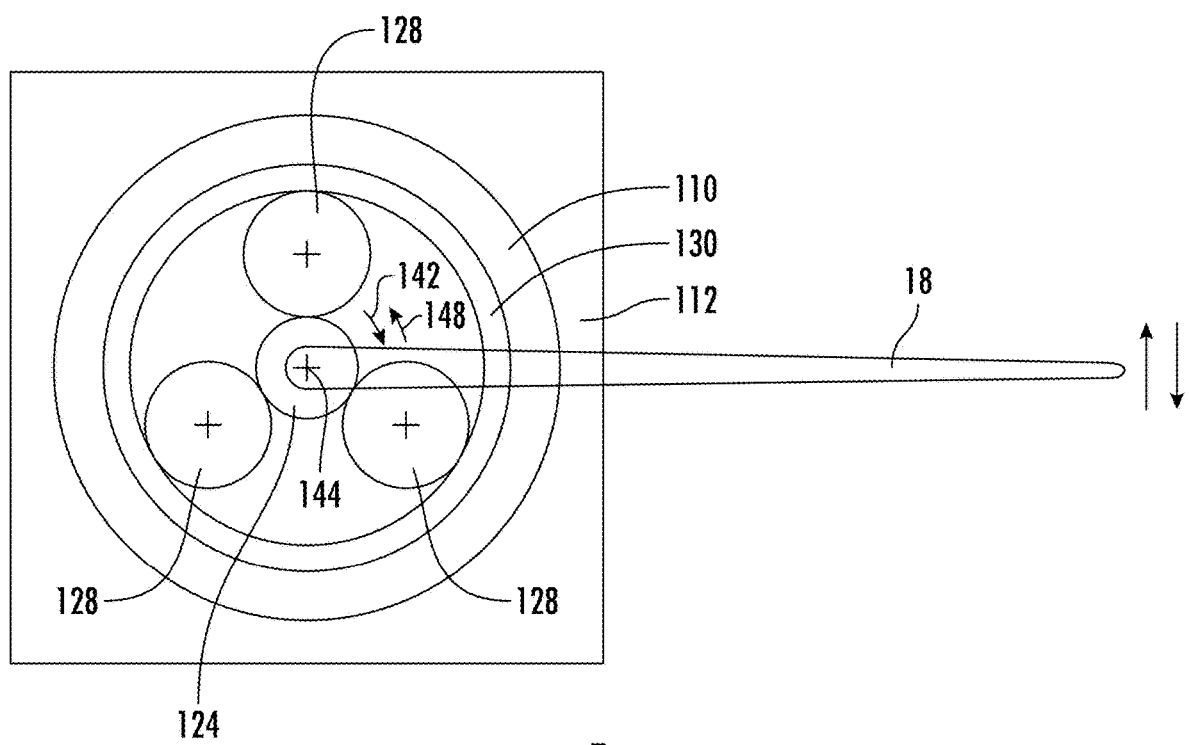
FIG. 5 is a schematic illustration of a portion of the actuator of FIG. 2 attached to a schematic representation of a control surface in the form of a spoiler at the hinge of the control surface.

In this example and with reference to FIG. 5, with the ring gear 130 nested within the unidirectional bearing 110, the outer perimeter of the unidirectional bearing 110 is grounded to the frame 112 while the inner perimeter to which the ring gear 130 is mounted is permitted to rotate relative to the outer perimeter, but only in a single direction.

With reference to FIG. 2, during normal deployment and stowage of the control surface, the controller 122 operatively energizes motor 102. The controller 122 powers the motor 102 to rotate in a first input direction 140 to drive sun gear 124 to operably cause the carrier 126 to rotate in a same first output direction 142 about axis 144 to deploy the control surface. To retract the control surface, the controller 122 powers the motor 102 in an opposite second input direction 146 to cause the carrier 126 to rotate in a same second input direction 148.

The power-off brake 106, when deenergized, acts to ground the motor 102 and the sun gear 124 to the frame 112 from rotating relative to the frame 112. As such, to allow the motor 102 to rotate and the sun gear 124 to rotate during normal deployment and stowage, the controller 122 energizes the power-off brake 106 to release the motor 102 and sun gear 124. This is illustrated schematically in FIG. 2 by a gap formed between the shaft connecting the motor 102 to the sun gear 124 and the power-off brake 106.

The power-on brake 108, when energized, grounds the ring gear 130 to the frame 112 preventing the ring gear 130 from rotating relative to the frame 112 about axis 144. This is illustrated schematically by the power-on brake 108 contacting ring gear 130. Thus, to drive the carrier 126 to operably deploy or stow the control surface during normal operation, the power-on brake 108 is energized by controller 122 grounding the ring gear 130 to frame 112.

As the ring gear 130 is grounded by power-on brake 108 during normal operation, the unidirectional bearing 110 is not relevant to normal operation of the actuator 100. Here, the power-on brake 108 may be considered to be connected in parallel to the unidirectional bearing 110. When the power-on brake 108 is energized, the actuator may be considered to be operating as a planetary gear.

Thus, during normal operation of the actuator 100, both brakes 106, 108 are energized and the motor is appropriately energized to drive the carrier 126 and attached control surface in the corrected deploy or stow direction.

Figure 3:
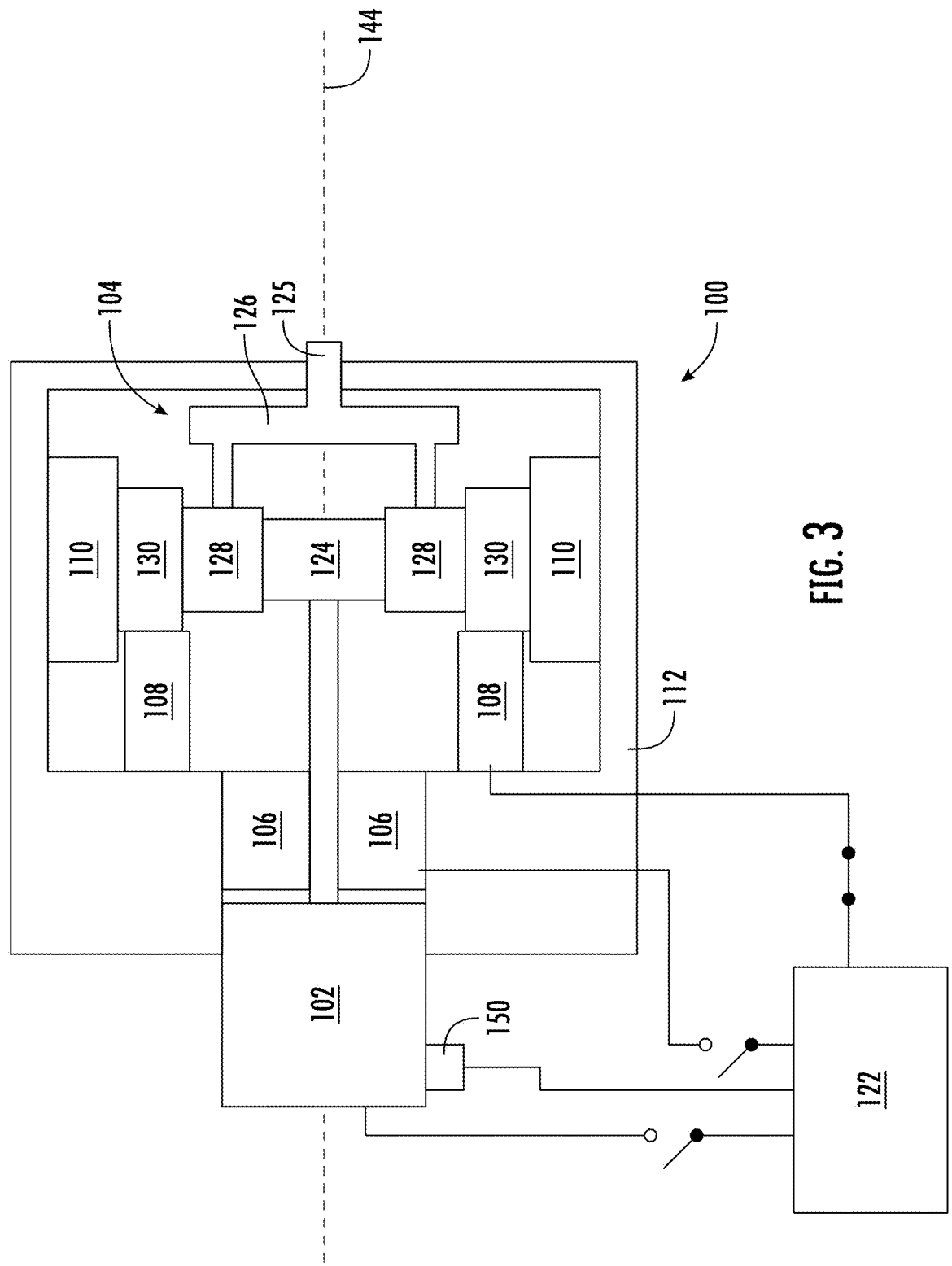
FIG. 3 is a schematic illustration of the control surface actuator of FIG. 2 in a hold mode where the actuator holds the control surface in a deployed position.

With reference to FIG. 3, when the actuator reaches a commanded position of extension, it may be required to hold the control surface at that position against external air loads on the control surface.

To hold the control surface in the partially or fully deployed commanded position against external loads (e.g. air loads) without requiring stalling motor 102 or causing motor 102 to consume power, the controller 122 deenergizes power-off brake 106 such that the sun gear is grounded to frame 112. This is illustrated schematically by power-off brake 106 contacting the shaft connecting motor 102 to sun gear 124. To prevent ring gear 130 from rotating and allowing carrier 126 to rotate therewith, the power-on brake remains energized 108 grounding the ring gear 130 to the frame 112. With the ring gear 130 and the sun gear 124 grounded to frame 112, the planet gears 128 and carrier 126 are prevented from rotating fixing the position of the control surface.

With the sun gear 124 grounded with the power-off brake 124, motor 102 need not be energized or to consume power to hold against external loads when the control surface remains in the commanded extended position.

Figure 4:
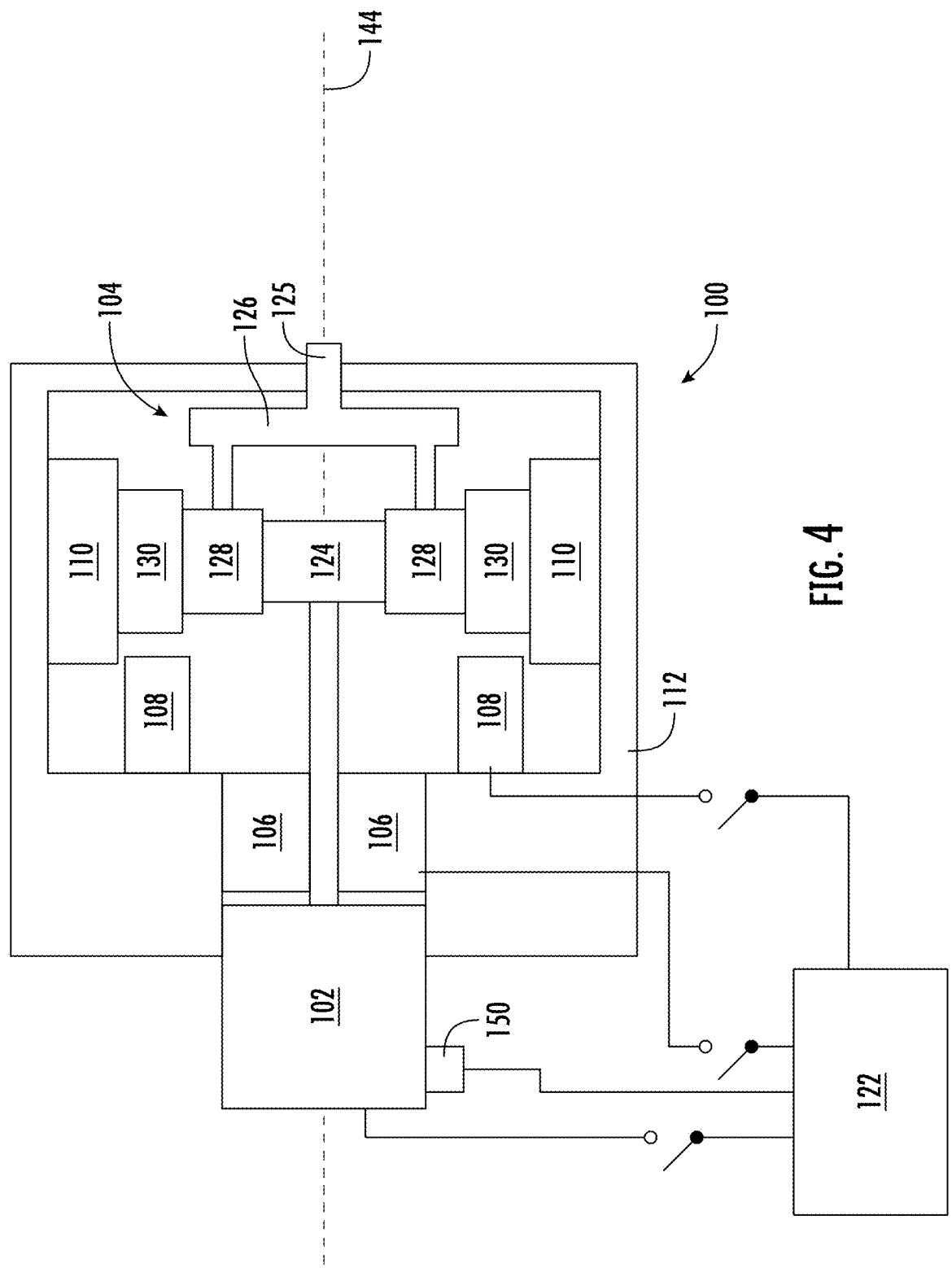
FIG. 4 is a schematic illustration of the control surface actuator of FIG. 2 in a go-down stay-down operational mode.

FIG. 4 illustrates the actuator 100 in the stowed configuration during normal operation. Here, to avoid excess energy drain, the motor 102 is deenergized, the power-off brake 106 is deenergized, and the power-on brake 108 is deenergized.

With the power-off brake 106 deenergized, the motor 102 and the sun gear 124 are grounded to frame 112 and prevented from rotating. With the power-on brake 108 deenergized, which is illustrated schematically by the gap between the power-on brake 108 and the ring gear 130, the power-on brake 108 is not grounding the ring gear 130 to frame 112. As such, the ring gear 130 would otherwise be permitted to rotate about axis 144 such that external forces (e.g. air loads) tending to deploy the control surface could rotate the carrier 126. However, the unidirectional bearing 110 is configured to allow the ring gear 130 to rotate only in the direction to stow the control surface but to ground the ring gear 130 to prevent rotation in the opposite direction required to deploy the control surface.

Thus, even though the power-on brake 108 is deenergized, the unidirectional bearing 110 prevents the ring gear 130 from rotating and consequently allowing the planet gears 128 and carrier 126 from rotating in the first output direction 142. Here, the epicyclical gear would be operating in solar mode. As such, with the motor 102, power-off brake 106 and power-on brake 108 all deenergized the control surface is still prevented from deploying due to external loads (e.g. air loads) on the control surface.

The actuator 100 operates as a planetary gear with the motor 102 driving carrier 126 so long as an external or internal failure to the actuator 100 has not occurred.

As noted, the actuator 100 is configured to address various failure modes and to have go-down stay down functionality.

With reference to FIG. 4, upon a power failure to the controller or any one of the motor 102, the power-off motor brake 106 and the power-on brake 108, the actuator 100 is configured such that external loading on the control surface can drive the control surface toward the stowed state but cannot drive the control surface to the deployed state or a more deployed state from its current state.

As illustrated in FIG. 4, the motor 102, power-off brake 106 and the power-on brake 108 are all deenergized (switches are open) which would simulate a power failure. Here, the power-off brake is in a grounded state and grounds the motor 102 and the sun gear 124 to the frame 112. However, because power is off, the power-on brake 108 does not ground the ring gear 130 to the frame 112 such that it is free to rotate. The epicyclic gear is now in solar gear mode.

As noted previously, because the ring gear 130 is carried by unidirectional bearing 110 relative to frame 112, the unidirectional bearing 110 prevents rotation of the ring gear 130 in the first output direction 142 about axis 144 to prevent deployment or further deployment of the control surface. However, the unidirectional bearing 110 does not ground the ring gear 130 in the opposite direction and permits rotation relative to frame 112 such that carrier 126 can rotate in the second output direction 148 towards the stowed state. Thus, upon power failure, the actuator 100 is configured to prevent further deployment but to allow the control surface to transition towards the stowed position due to external forces (e.g. air loads) thereon.

Upon a jam failure where either the motor 102 or a gear is jammed preventing rotation of motor 102, the actuator again, allows for the control surface to retract to a stowed position. The actuator 100 includes a sensor 150 (see FIG. 1), such as a hall sensor or current sensor, that detects when the motor 102 is or is not rotating. If the controller 122 is attempting to deploy or retract the control surface by energizing motor 102 and sensor 150 indicates that the motor is not rotating, the controller 122 can operate in a jam mode. Here, the controller 122 will deenergize the power-on brake 108 and the power-off brake 106. The motor 102 will preferably be deenergized as well. With both brakes 106 and 108 deenergized, operation of the actuator is similar to FIG. 4 as outlined above. The jam failure could be an electrical or mechanical failure.

With both brakes deenergized, sun gear 124 is grounded by way of power-off brake 106 and ring gear 130 is permitted to only rotate, via unidirectional bearing 110, in the stowing direction to allow for the control surface to transition to the stowed position but is prevented to rotate in the deploying direction.

In the event of a controller command runaway (equivalent to servo runaway in a conventional actuator), the position of the motor 102 is detected by sensor 150. If a mis-compare with the commanded position is detected by the controller 122, the actuator 100 is electrically deenergized (e.g. motor 102, power-off brake 106 and power-on brake 108) such that the actuator can operate under the go-down stay-down functionality as described above.

Notably, controller 122 is illustrated as a single component. However, controller 122 could be a plurality of different modules that communicate with one another. For example, part of the controller could be provided by the flight control computer. This could be particularly true if the sensor communicates with the flight control computer which in turn gets information from controller 122 to compare actual position vs. desired/controlled position of the motor 102 and consequently the control surface.

As illustrated above, the actuator 100 is an electromechanical actuator that has features that allow it to have the same operating characteristics as conventional hydraulic control. It has the go-down stay-down feature to protect against failure conditions that are normally provided by a hydraulic check valve in conventional hydraulic control surface actuators.

Further, by being a rotary actuator, the actuator 100 is suitable for use in thin-wing aircraft where linear spoiler actuators would require fairings or other drag inducing methods to fit into the envelop provided by the thin wing.

As noted above, the output of the actuator 100, e.g. output shaft 125 of carrier 126, is preferably on the hinge line of the control surface. However, this arrangement is not required in all implementations.

If additional gear reduction from the motor 102 to the carrier 126 is required, a planetary reduction gear can be added between the motor output shaft and the sun gear 124 of epicyclic gear 104 described above. Alternatively, a planetary gear can be placed at the output of the carrier 126. If a large gear reduction is required, compound planetary gears can be incorporated at the motor 102 or the output of the carrier 126.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An actuator for rotating a spoiler of an aircraft between a stowed position and a deployed position, the actuator comprising:
    a frame;
    an electric motor having an output;
    an epicyclic gear having a sun gear, planetary gears coupled to a carrier, and a ring gear, the sun gear being operably coupled to the output of the motor, the carrier operably couplable to the spoiler such that rotation of the carrier in a first direction corresponds to transitioning the spoiler from the stowed position toward the deployed position and rotation of the carrier in an opposite second direction corresponds to transitioning the spoiler from the deployed position toward the stowed position;
    a power-off brake operably coupled to the sun gear to ground the sun gear to the frame when deenergized;
    a power-on brake operably coupled to the ring gear to ground the ring gear to the frame when energized; and
    a unidirectional bearing connecting the ring gear to the frame, when the power-on brake is deenergized, the unidirectional bearing permits the ring gear to rotate in the second direction relative to the frame and prevents the ring gear from rotating in the first direction relative to the frame.

2. The actuator of claim 1, wherein the frame is in the form of a housing, the motor grounded to the housing, the power-off brake grounding the sun gear to the housing when deenergized and the power-on brake grounding the ring gear to the housing when energized.

3. The actuator of claim 1, further comprising a controller operably coupled to and configured to selectively energize the motor, the power-off brake, and the power-on brake.

4. The actuator of claim 3, wherein the controller is configured to rotate the carrier in the first direction by:
    a) energizing the motor to rotate the output thereof in a first motor direction;
    b) energizing the power-off brake to unground the sun gear; and
    c) energizing the power-on brake to ground the ring gear.

5. The actuator of claim 4, wherein the controller is configured to rotate the carrier in the second direction by:
    a) energizing the motor to rotate the output thereof in a second motor direction, opposite the first motor direction;
    b) energizing the power-off brake; and
    c) energizing the power-on brake.

6. The actuator of claim 3, wherein when the controller does not energize the power-on brake, the carrier and ring gear are:
    a) rotatable in the second direction via the unidirectional bearing by an external loading applied to the carrier, and
    b) not rotatable in the first direction via the unidirectional bearing by an external loading applied to the carrier.

7. The actuator of claim 3, further comprising a motor position sensor configured to sense a position of the motor; and
    wherein if the motor position sensor senses a motor position that is not at a commanded position, the controller is configured to deenergize the motor, power-off brake, and power-on brake.

8. The actuator of claim 1, wherein when the power-on brake is deenergized, the unidirectional bearing:
    a) permits the ring gear to rotate relative to the frame in the second direction; and
    b) prevents the ring gear from rotating in the first direction relative to the frame.

9. The actuator of claim 3, wherein the controller is configured to operate in a deploy mode where the carrier is rotated in the first direction, in the deploy mode, the controller:
    a) energizes the power-off brake to permit rotation of the sun gear;
    b) energizes the power-on brake to ground the ring gear; and
    c) energizes the motor to rotate the sun gear and planet gears to operably drive the carrier in the first direction; and
    d) upon a desired rotation of the carrier in the first direction, to maintain the position of the carrier, the controller:
        i) deenergizes the power-off brake to ground the sun gear;
        ii) deenergizes the motor; and
        iii) maintains the power-on brake energized.

10. The actuator of claim 1, wherein upon an electrical failure and the motor, power-off brake, and power-on brake are all deenergized:
    a) the power-off brake grounds the sun gear to the frame;

b) the power-on brake does not ground the ring gear to the frame permitting the ring gear and carrier to rotate in the second direction via the unidirectional bearing relative to the frame; and c) the unidirectional bearing prevents rotation of the ring gear and carrier in the first direction relative to the frame.

11. The actuator of claim 3, further comprising a motor rotation sensor configured to sense rotation of the output of the motor;

wherein if the motor rotation sensor senses that the output of the motor is not rotating when energized, the controller:
a) deenergizes the power-off brake to ground the sun gear and
b) deenergizes the power-on brake to release the ring gear and permit rotation of the ring gear and carrier in the second direction via the unidirectional bearing.

12. The actuator of claim 1, wherein:
a) in an operation mode in which the carrier is operably rotated by the motor:
  i) the power-off brake is energized;
  ii) the motor is energized; and
  iii) the power-on brake is energized; and
a) in a failure mode in which at least one of a motor jam, controller runaway, or electrical failure has occurred:
  i) the power-off brake is deenergized grounding the sun gear;
  ii) the power-on brake is deenergized releasing the ring gear;
  iii) the motor is deenergized; and
  iv) the ring gear and carrier are permitted to rotate in the second direction via the unidirectional bearing.

13. A spoiler system for an aircraft comprising:
a spoiler pivotable between a stowed position and a deployed position;
an actuator of claim 1 having the carrier coupled to the spoiler such that rotation of the carrier in the first direction transitions the spoiler towards the deployed position and rotation of the carrier in the second direction transitions the spoiler towards the stowed position.

14. The spoiler system of claim 13, wherein when:
a) the power-off brake is deenergized; and
b) the power-on brake is deenergized;
the ring gear and carrier can rotate in the second direction via the unidirectional bearing to transition the spoiler towards the stowed position due to an external load forcing the spoiler towards the stowed position and the ring gear and carrier cannot rotate in the first direction via the unidirectional bearing such that the spoiler cannot transition towards the deployed position.

15. A method of operating the actuator of claim 1 comprising:
a) operating in a normal mode including:
  i) energizing the power-off brake to release the sun gear;
  ii) energizing the power-on brake to ground the ring gear;
  iii) energizing the motor in the first direction to rotate the sun gear in the first direction and to rotate the carrier in the first direction;
b) operating in a failure mode including:
  i) deenergizing the power-off brake to ground the sun gear;
  ii) deenergizing the power-on brake to release the ring gear;
  iii) rotating the carrier in the second direction in response to an external force to the carrier and rotating the ring gear and carrier in the second direction through the unidirectional bearing;
  iv) preventing the carrier from rotating in the first direction by having the sun gear grounded with the power-off brake and preventing rotation of the ring gear in the first direction with the unidirectional bearing.

16. The method of claim 15, wherein the steps of deenergizing the power-off brake and deenergizing the power-on brake occurs by a power failure.

17. The method of claim 15, wherein operating in the failure mode includes:
prior to:
  a) deenergizing the power-off brake to ground the sun gear;
  b) deenergizing the power-on brake to release the ring gear;
  c) rotating the carrier in the second direction by applying an external force to the carrier and rotating the ring gear and carrier in the second direction via the unidirectional bearing;
sensing an operational malfunction of the actuator including at least one of:
  a) a power failure to at least one of the motor, power-off brake, or power-on brake;
  b) a mechanical jam of the motor; or
  c) a motor malfunction including at least one of:
    i) the motor output being in a wrong sensed position; or
    ii) the motor output failing to turn when being energized.

* * * * *